(12) United States Patent  
Sheetrit (10) Patent No.: US 12,509,800 B2
(45) Date of Patent: Dec. 30, 2025

(54) BIOCOMPATIBLE NANOFIBER ADHESIVE (71) Applicant: Vitaloc Ltd, Herzliya (IL)

(72) Inventor: Eyal Sheetrit, Shoham (IL)

(73) Assignee: Vitaloc Ltd, Herzliya (IL)

( * ) Notice: Subject to any disclaimer, the term of this patent is extended or adjusted under 35 U.S.C. 154(b) by 1229 days.

(21) Appl. No.: 16/626,553

(22) PCT Filed: Jun. 26, 2018

(86) PCT No.: PCT/IL2018/050702
§ 371 (c)(1),
(2) Date: Dec. 25, 2019

(87) PCT Pub. No.: WO2019/003224
PCT Pub. Date: Jan. 3, 2019

(65) Prior Publication Data
US 2020/0224333 A1    Jul. 16, 2020

Related U.S. Application Data (60) Provisional application No. 62/524,647, filed on Jun. 26, 2017.

(51) Int. Cl.
*D01D 5/00* (2006.01)
*A61L 15/32* (2006.01)
(Continued)

(52) U.S. Cl.
CPC ............ *D01D 5/0046* (2013.01); *A61L 15/32* (2013.01); *A61L 15/38* (2013.01); *B82Y 30/00* (2013.01);
(Continued)

(58) Field of Classification Search
CPC ........ D01D 5/0046; D01D 1/02; D01D 5/003; A61L 15/32; A61L 15/38; A61L 2400/12;
(Continued)

(56) References Cited

U.S. PATENT DOCUMENTS 8,961,544 B2    2/2015   Komlos et al.
2004/0110439 A1    6/2004   Chaikof et al.
(Continued)

FOREIGN PATENT DOCUMENTS

CN    106591992    4/2017
WO    2008076407    6/2008
(Continued)

OTHER PUBLICATIONS

Yung, C.W. et al. "Transglutaminase Crosslinked Gelatin as a Tissue Engineering Scaffold." Journal of Biomedical Materials Research Part A. 15.83(4): 2007. 1039-1046. (Year: 2007).*
(Continued)

*Primary Examiner* — Jenna N Chandhok (57) ABSTRACT

A nanofiber comprising a cross-linkable protein polymer and a transglutaminase. A method for producing a nanofiber, the method comprising: combining a first solution comprising a cross-linkable protein polymer and a second solution comprising a transglutaminase to produce a liquid electro spinning mixture (LEM) characterized by an environment that is unsuitable for the transglutaminase to be enzymatically active on the cross-linkable protein polymer; and electro spinning the LEM to form a nanofiber comprising the TGase and the cross-linkable protein polymer.

34 Claims, 4 Drawing Sheets

| Sample name | Gelatin solution | mTG solution | LEM | Gelatin content (grams) | U/ml of mTG solution | Total mTG Units (U) | Total mTG mass (mg) 100U=3mg | mTG(mg): Gelatin(g) weight ratio |
|---|---|---|---|---|---|---|---|---|
| TFE+ TG80 | TFE 10 g | TG80 0.88 mL | D1 | 0.80 | 80 | 70.4 | 2.112 | 2.64 |
| TFE+ TG120 | TFE 10 g | TG120 0.88 mL | D1 | 0.80 | 120 | 105.6 | 3.168 | 3.96 |
| TFE+ TG600 | TFE 10 g | TG600 0.88 mL | D1 | 0.80 | 600 | 528 | 15.84 | 19.8 |
| TFE control | TFE 10 g | n/a | n/a | 0.80 | n/a | n/a | n/a | n/a |
| AAA+ TG80 | AAA 10 g | TG80 0.88 mL | D2 | 3.00 | 80 | 70.4 | 2.112 | 0.704 |
| AAA+ TG120 | AAA 10 g | TG120 0.88 mL | D2 | 3.00 | 120 | 105/6 | 3.168 | 1.056 |
| AAA+ TG600 | AAA 10 g | TG600 0.88 mL | D2 | 3.00 | 600 | 528 | 15.84 | 5.28 |
| AAA control | AAA 10 g | n/a | n/a | 3.00 | n/a | n/a | n/a | n/a |

(51) Int. Cl.
| | |
|---|---|
| A61L 15/38 | (2006.01) |
| B82Y 30/00 | (2011.01) |
| B82Y 40/00 | (2011.01) |
| D01D 1/02 | (2006.01) |
| D01F 1/10 | (2006.01) |
| D01F 4/00 | (2006.01) |
| D01F 8/02 | (2006.01) |
| D04H 1/4266 | (2012.01) |
| D04H 3/005 | (2012.01) |

(52) U.S. Cl.
CPC ............... *B82Y 40/00* (2013.01); *D01D 1/02* (2013.01); *D01F 1/10* (2013.01); *D01F 4/00* (2013.01); *D01F 8/02* (2013.01); *D04H 3/005* (2013.01); *A61L 2400/12* (2013.01); *D04H 1/4266* (2013.01); *D10B 2211/20* (2013.01); *D10B 2509/00* (2013.01); *Y10T 442/614* (2015.04)

(58) Field of Classification Search
CPC .... D01F 1/10; D01F 4/00; D01F 8/02; D04H 3/005; D04H 1/4266; D10B 2211/20; D10B 2509/00; Y10T 442/614
See application file for complete search history.

(56) References Cited

U.S. PATENT DOCUMENTS

| | | |
|---|---|---|
| 2010/0174351 A1 | 7/2010 | Ng et al. |
| 2016/0106883 A1 | 4/2016 | MacPhee et al. |

FOREIGN PATENT DOCUMENTS

| | | |
|---|---|---|
| WO | 2012017415 | 2/2012 |
| WO | WO 2019/003224 | 1/2019 |

OTHER PUBLICATIONS

International PCT Search Report and Written Opinion dated Oct. 22, 2018 for PCT/IL2018/050702 filed on Jun. 26, 2018.
Nagarajan et al; Novel biocompatible electrospun gelatin fiber mats with antibiotic drug delivery properties; Journal of Materials Chemistry B, 4(6), pp. 1134-1141 https://pubs.rsc.org/en/content/articlelanding/2015/tb/c5tb01897h/unauth#!divAbstract; Dec. 30, 2015.
Jeong et al.; Preparation and characterization of gelatin nanofibers containing silver nanoparticles.; International journal of molecular sciences, 15(4), pp. 6857-6879; Apr. 22, 2014 https://www.mdpi.com/1422-0067/15/4/6857/htm.
Hoque et al.; Gelatin based scaffolds for tissue engineering—a review. Polymers Research Journal, 9(1), 15 (2015). https://www.researchgate.net/profile/Md_Enamul_Hoquepublication/272748016_Gelatin_Based_Scaffolds_For_Tissue_Engineering_-_A_review/links/54f5691b0cf2ba615065e055/Gelatin-Based-Scaffolds-For-Tissue-Engineering-A-review.pdf; R. G. S. V.; Dec. 31, 2015 Chapter 3.1, p. 20, Chapter 4.3, p. 24.
International Preliminary Report on Patentability Dated Dec. 31, 2019 From the International Bureau of WIPO Re. Application No. PCT/IL2018/050702. (7 Pages).
International Search Report and the Written Opinion Dated Oct. 22, 2018 From the International Searching Authority Re. Application No. PCT /IL20 18/050,702. (12 Pages).
Supplementary Partial European Search Report and the Provisional Opinion Dated Mar. 30, 2021 From the European Patent Office Re. Application No. 18823904.0. (10 Pages).
Ahmed et al. "Fibrin: A Versatile Scaffold for Tissue Engineering Applications", Tissue Engineering Part B: Reviews, XP002677376, 14(2):199-215, Jun. 10, 2008.
Hoque et al. "Gelatin Based Scaffolds For Tissue Engineering—A Review", Polymers Research Journal 9(1):15-32, 2015.
Jeong et al. "Preparation and Characterization of Gelatin Nanofibers Containing Silver Nanoparticles", International Journal of Molecular Sciences 15(4):6857-6879, Apr. 22, 2014.
Nagarajan et al. "Novel Biocompatible Electrospun Gelatin Fiber Mats With Antibiotic Drug Delivery Properties", Journal of Materials Chemistry B, 4: 1134-1141, Dec. 30, 2015.
Pandya et al. "Elevated Temperature Electrospinning of Aqueous Gelatin Solution and Crosslinking for Tissue Engineering Applications", Proceedings of the 2010 IEEE 36th Annual Northeast Bioengineering Conference (NEBEC), XP031664990,:1-2, Mar. 26, 2010.
Torres-Giner et al. "Comparative Performance of Electrospun Collagen Nanofibers Cross-linked by Means of Different Methods", ACS Applied Materials & Interfaces, XP055783794, 1(1):218-223, Nov. 24, 2008.

\* cited by examiner

| Sample name | Gelatin solution | mTG solution | LEM | Gelatin content (grams) | U/ml of mTG solution | Total mTG Units (U) | Total mTG mass (mg) 100U=3mg | mTG(mg):Gelatin(g) weight ratio |
|---|---|---|---|---|---|---|---|---|
| TFE+TG80 | TFE 10 g | TG80 0.88 mL | D1 | 0.80 | 80 | 70.4 | 2.112 | 2.64 |
| TFE+TG120 | TFE 10 g | TG120 0.88 mL | D1 | 0.80 | 120 | 105.6 | 3.168 | 3.96 |
| TFE+TG600 | TFE 10 g | TG600 0.88 mL | D1 | 0.80 | 600 | 528 | 15.84 | 19.8 |
| TFE control | TFE 10 g | n/a | n/a | 0.80 | n/a | n/a | n/a | n/a |
| AAA+TG80 | AAA 10 g | TG80 0.88 mL | D2 | 3.00 | 80 | 70.4 | 2.112 | 0.704 |
| AAA+TG120 | AAA 10 g | TG120 0.88 mL | D2 | 3.00 | 120 | 105/6 | 3.168 | 1.056 |
| AAA+TG600 | AAA 10 g | TG600 0.88 mL | D2 | 3.00 | 600 | 528 | 15.84 | 5.28 |
| AAA control | AAA 10 g | n/a | n/a | 3.00 | n/a | n/a | n/a | n/a |

BIOCOMPATIBLE NANOFIBER ADHESIVE

RELATED APPLICATIONS

This application is a U.S. National Phase of PCT Application No. PCT/IL2018/050702, filed on Jun. 26, 2018, which claims benefit under 35 U.S.C. 119(e) of U.S. Provisional Application 62/524,647 filed on Jun. 26, 2017, the disclosure of which is incorporated herein by reference.

BACKGROUND

Surgical wound closure is currently achieved by sutures and staples that facilitate healing by pulling tissues together. However, very often they do not achieve hemostasis or other fluid-stasis in peripheral surgeries. That is say, they fail to produce the adequate seal necessary to prevent fluid leakage following surgery, including leaks that frequently occur along staple and suture lines.

SUMMARY

An aspect of an embodiment of the disclosure relates to a nanofiber comprising a transglutaminase and a cross-linkable protein polymer. For convenience of presentation, a nanofiber in accordance with an embodiment of the disclosure may be referred to herein as an "X-Nano fiber".

A cross-linkable protein polymer in accordance with an embodiment of the disclosure comprises residues, by way of example lysine and glutamine residues, that are not in a cross-linked state, and are thus potentially available to be cross-linked by a TGase. Optionally, the cross-linkable protein polymer comprises no crosslinked residues, and/or has not been previously subjected to TGase crosslinking. Optionally, at least 25%, at least 50%, at least 75%, or at least 90% of the lysine and glutamine residues are not in a cross-linked state.

In an embodiment of the disclosure, the cross-linkable protein polymer is a gelatin. In an embodiment of the disclosure, the TGase is a microbial TGase (mTGase).

In an embodiment of the disclosure, the nanofibers comprised in Fiberglue comprising mTGase and gelatin is characterized by a TGase (mg):gelatin (g) weight ratio of between 1 mg:1 g and 20 mg:1 g, between 5 mg:1 g and 20 mg:1 g, at least 3 mg:1 g, at least 4 mg:1 g, or at least 5 mg:1 g.

An aspect of an embodiment of the disclosure relates to providing a nanofiber mat comprising a plurality of nanofibers, the plurality of nanofibers comprising a transglutaminase (TGase) and a cross-linkable protein polymer. In an embodiment of the disclosure, Fiberglue is configured such that the cross-linkable protein polymer becomes crosslinked, or further cross-linked, by the TGase when the mat is exposed to water, such that the nanofiber mat exhibits adhesive properties upon wetting, or upon being applied to a wetted or moist surface, by way of example a wound or a surgical incision. For convenience of presentation, a nanofiber mat in accordance with an embodiment of the disclosure may be referred to herein as a "Fiberglue".

In an embodiment of the disclosure, a Fiberglue comprises an X-Nano fiber. Additionally or alternatively, a Fiberglue comprises: a first nanofiber comprising a synthetic polymer and the TGase; and a second nanofiber comprising the cross-linkable protein polymer.

In an embodiment of the disclosure, a Fiberglue is operable to provide adhesion of at least 1 N, at least 2 N, at least 2.5 N, at least 2.75 N between two wet proteinaceous surfaces, optionally as measured by a T-peel test. Optionally, the strength of adhesion as measured by the T-peel test is obtained where the proteinaceous surface is a surface of a collagen film, the adhered surface being peeled having a width of 20 mm and length of 80 mm, and the speed of peeling being 40 millimeters (mm) per minute.

Another aspect of an embodiment of the disclosure relates to a method for producing an X-Nano fiber, the method comprising: mixing a first solution comprising a cross-linkable protein polymer and a second solution comprising a TGase to produce a liquid electrospinning mixture (LEM) characterized by an environment that is unsuitable for the TGase to be enzymatically active on the cross-linkable protein polymer, electrospinning the LEM to form a nanofiber. In an embodiment of the disclosure, the environment provided by the LEM that is unsuitable for the TGase to be enzymatically active on the cross-linkable protein polymer is characterized by one or more the following characteristics: a pH of 5 or less; a combined total liquid composition of the LEM being less than 50% water and/or more than 50% organic solvent; and the LEM being an emulsion in which the first solution comprising the cross-linkable protein polymer and the second solution comprising a TGase are kept separate as a first phase and second phase, respectively.

In an an embodiment of the disclosure, a method for producing a Fiberglue comprises collecting X-Nano fibers to form a nanofiber mat.

An alternative method for producing a Fiberglue comprises: electrospinning a first LEM comprising a cross-linkable protein polymer to form a first nanofiber; electrospinning a second LEM comprising a TGase and a synthetic polymer to form a second a nanofiber; and directing the first and second nanofibers to a common target surface, such that the first and second nanofibers commingle in a same nanofiber mat.

In an embodiment of the disclosure, the cross-linkable protein polymer is a gelatin. In an embodiment of the disclosure, the TGase is a microbial TGase (mTGase).

In an embodiment of the disclosure, the LEM further comprises a surfactant. Optionally, the surfactant comprises one or a combination of two or more of: a cationic surfactant, an ionic surfactant, and a non-ionic surfactant.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Adhesion in biological systems may be mediated by a crosslinking of protein polymers. By way of example, marine mussels and barnacles attach themselves to surfaces by depositing mixtures of protein polymers and then enzymatically cross-linking these polymers for curing.

A TGase is an enzyme that catalyzes the formation of an isopeptide bond between a free amine group (e.g., protein- or peptide-bound lysine) and the acyl group at the end of the side chain of protein- or peptide-bound glutamine. As such, TGase can selectively mediate a chemical reaction between glutamine and lysine residues on adjacent protein fibers, thus providing covalent amide bonds that serve to reinforce a three-dimensional matrix of protein polymers. Examples of TGases include Factor XII, keratinocyte TGase, tissue TGase, epidermal TF, prostate TGase, TGaseM X, TGaseM Y and TGaseM Z. Other examples of TGases include TGase of microbiological origin (which may be referred to herein as "mTGase"). mTGases have low molecular weight, as opposed to transglutaminases isolated from animal tissues. mTGase is a single polypeptide with a molecular weight of approx. 38 kDa. Enzymes biosynthesised by bacteria, including mTGase are stable at a wide range of pH values, by way of example from 4.5 to 8.0. However, mTGases enzymatic activity is pH sensitive: temperature of 40° C. at pH 5.5 is the most favorable for mTGase's catalytic activity. (Kieliszek et al., Folia Microbiol Folia Microbiol (Praha). 2014; 59(3): 241-250.)

For the first time, as described hereinbelow, the inventors of the present application has developed methods ("TGase inactivated electrospinning") for creating a high surface-area-to-volume matrix comprising cross-linkable protein polymers in close proximity with a TGase in the form of nanofibers. Two methods, single-fiber TGase inactivated electrospinning and two-fiber TGase inactivated electrospinning, are described herein. Nanofiber are fibers having a diameter in the submicron range, by way of example between 100 nm and 900 nm, and electrospinning is a nanofiber production method which uses electric force to draw charged threads of polymer solutions, emulsions, or melts. A variety of electrospinning methods are known in the art.

Cross-linking of cross-linkable protein polymer by TGase typically requires an aqueous environment. Without being bound by theory, having a TGase and a cross-linkable protein polymer in close proximity in a matrix having high surface area-to-volume ratio would advantageously allow for fast cross-linking between the cross-linkable protein polymers resulting in adhesion when placed on a wet surface, for example a wound. Advantageously, cross-linking by TGase, and thus adhesion, would occur after the matrix is exposed to water and not before. However, creating a composition comprising both TGase and cross-linkable protein polymer together would typically result in the cross-linkable protein polymer interacting with the TGase and thus becoming cross-linked during the production process. TGase inactivated electrospinning in accordance with an embodiment of the disclosure and as described herein is advantageously able to produce a composition comprising both TGase and cross-linkable protein polymer together in close proximity in a matrix having high surface area-to-volume ratio, while minimizing or eliminating TGase cross-linking of the protein polymer during the production process, such that the protein polymer remains cross-linkable by TGase even at the completion of the production process.

Single-fiber TGase inactivated electrospinning in accordance with an embodiment of the disclosure comprises: preparing a LEM comprising a cross-linkable protein polymer and a TGase, the LEM being characterized by providing an environment that is unsuitable for the TGase to be enzymatically active on the cross-linkable protein polymer; and electrospinning the LEM to produce an X-Nano fiber comprising the cross-linkable protein polymer and the TGase. The Single-fiber TGase inactivated electrospinning method optionally further comprises collecting the X-Nano fiber to form a nanofiber mat.

Optionally, a LEM is prepared by combining a cross-linkable protein polymer solution and a TGase solution.

Optionally, the cross-linkable protein polymer solution comprises, as a solvent, an acidic or an organic solvent. Optionally, the acidic solvent acetic acid, optionally glacial acetic acid or diluted with water. Optionally, the acidic solvent comprises water and acetic acid at a concentration between 50% and 90% acetic acid, optionally about 75% acetic acid. Optionally, the acidic solvent comprises formic acid. Optionally, the organic solvent is 2,2,2-Trifluoroethanol (TFE) or 1,1,1,3,3,3-hexafluoro-2-propanol (HFIP).

Optionally, the cross-linkable protein polymer is selected from the group consisting of a fibrin, an elastin, an albumin, a gelatin and a collagen.

Optionally, the cross-linkable polymer comprises a gelatin. Optionally, the gelatin is animal-derived. Optionally, the gelatin comprises gelatin from mammalian origins, and optionally comprises one or more of pork skins, pork and cattle bones, or split cattle hides, or any other pig or bovine source. Optionally, the gelatin comprises porcine gelatin since it has a lower rate of anaphylaxis. Optionally, the gelatin comprises gelatin from fish sources. Optionally, the gelatin comprises recombinant gelatin. Gelatin from animal origins may optionally be of type A (Acid Treated) or of type B (Alkaline Treated). Optionally, the gelatin from animal origins comprises gelatin obtained during a first extraction, which is generally performed at lower temperatures (50-60° C.). Gelatin produced in this manner is in the range of 250-300 bloom and has a high molecular weight of at least about 95-100 kDa. As such, the gelatin optionally has bloom value of 250 bloom to 300 bloom. In a particular embodiment, the gelatin has a bloom value of about 300 bloom.

Optionally, a cross-linkable protein polymer solution comprising a gelatin comprises a gelatin at a concentration of between 5 mg/ml and 500 mg/ml, or between 200 mg/ml and 400 mg/ml gelatin. The concentration of the gelatin may depend on the solvent.

Optionally, the TGase comprised in the TGase solution comprises a mTGase. Optionally, a TGase solution comprises mTGase at a concentration of between 50 U/ml and 1000 U/ml, between 80 U/ml and 600 U/ml, between 400 U/ml and 700 U/ml, about 500 U/ml, about 600 U/ml and about 700 U/ml. Optionally, the solvent of the TGase solution is water.

Optionally, the cross-linkable protein polymer solution and the TGase solution are mixed to form a LEM (a "PPTGase LEM") by one or more of: hand mixing, vortexing, sonication, and mechanical homogenization.

Optionally, a PPTGase LEM is characterized by an environment (a "TGase-blocking environment") that is unsuitable for the TGase to be enzymatically active on the cross-linkable protein polymer. Optionally, a TGase-blocking environment comprises one or more of: a pH of 5 or less, less than 4 or between 3.5 and 4; a combined total liquid composition of the LEM being less than 50% water and/or more than 50% organic solvent; and being an emulsion in which the cross-linkable protein polymer solution and the TGase solution are kept separate as a first phase and second phase, respectively.

Optionally, the LEM comprises a surfactant. Optionally, the surfactant comprises one or a combination of: an anionic surfactant, by way of example sodium dodecyl sulfate (SDS); a cationic surfactant, by way of example benzyltriethylammonium, chloride (TEBAC); and a non-ionic surfactant, by way of example sorbitan monooleate (Span80). Optionally, the LEM comprises sufficient surfactant so that the concentration of the surfactant is at or above a critical micelle concentration (CMC) for the surfactant.

Two-fiber TGase inactivated electrospinning in accordance with an embodiment of the disclosure process comprises: electrospinning a cross-linkable protein polymer solution to produce a first nanofiber; simultaneously electrospinning a LEM comprising a TGase and a synthetic polymer to produce a second nanofiber; and collecting the first and second nanofibers on a common surface to form a commingled nanofiber mesh.

Optionally, the cross-linkable protein polymer comprises one or a combination of two or more of a cross-linkable protein polymer: a fibrin, an elastin, an albumin, a gelatin and a collagen. Optionally, a cross-linkable protein polymer solution comprises, as a solvent, an acidic or an organic solvent. Optionally, the acidic solvent comprises acetic acid, optionally glacial acetic acid or diluted with water at a concentration between 50% and 90% acetic acid, optionally at a concentration of about 75% acetic acid. Optionally, the acidic solvent comprises formic acid. Optionally, the organic solvent comprises or consists of TFE or HFIP.

Optionally, where the cross-linkable protein polymer solution comprises a gelatin, the solution comprises between 5 mg/ml and 500 mg/ml gelatin. The concentration of gelatin may depend on the solvent. By way of example, gelatin has higher solubility in an acetic acid solvent compared to a TFE solvent.

Optionally, the TGase solution comprises mTGase, optionally at a concentration of between 50 U/ml and 1000 U/ml, between 80 U/ml and 600 U/ml, between 400 U/ml and 700 U/ml, about 500 U/ml, about 600 U/ml and about 700 U/ml. Optionally, the solvent of the TGase solution is water.

Optionally, the synthetic polymer is a polyester. Optionally, the polyester is biocompatible. Optionally, the biodegradable polyester comprises a Polycaprolactone (PCL) and/or a poly (lactide-co-e-caprolactone) (PLCL). By way of example, a PLCL is Poly(L-lactide-co-ε-caprolactone) 70:30 (RESOMER® LC 703S). Optionally, the synthetic polymer comprises one or more of: PC (polycarbonate); PCU (polycarbonate uethane); PDO, PDS (Polydioxanone); PEO (poly ethylene oxide); PES (polyesthersulfone); EVA or PEVA (poluethylene-co-vinyl acetate); PGA (polyglutamic acid); PGCA (poly(glycolic acid); PGS (poly(glycerol sebacate); PHBV (Poly(3-hydroxybutyrate-co-3-hydroxyvalerate); PHB (Polyhydroxybutyrate); PLA (Poly(L-lactic)); PLA-PEG (D,L-Lactic-polyethylene glycol); PLGA (poly(lactic-co-glycolic acid); PLLA (poly-L-lactic acid); PMMA (poly(methyl methacrylate); PU (poly urethane); PVA (poly vinyl alcohol); PVAc (poly vinyl acetate); and a PVP (poly vinyl pryrrolidone).

Optionally, the LEM is prepared by combining a synthetic polymer solution and a TGase solution. Optionally, the LEM is a combined solution or an emulsion of the synthetic polymer solution and the TGase solution.

EXAMPLES

Example 1: Preparation of Solutions and Liquid Mixtures for Electrospinning

A. Gelatin Solutions

Gelatin solution TFE was prepared by dissolving gelatin into TFE at a concentration of 8% (w/w).

Gelatin solution AAA was prepared by dissolving gelatin in 75% acetic acid (25% water) at a concentration of 300 mg/ml.

For both gelatin solutions, the following gelatin was used: Gelatin (type A from porcine, Bloom value 250) obtained from Sigma-Aldrich (St. Louis, MO). The TFE and the acetic acid (as anhydrous glacial acetic acid) were also obtained from Sigma-Aldrich.

B. TGase Solutions

TGase Solution was prepared by dissolving calcium-independent mTGase into water. The mTGase was obtained in powder form from Ajinomoto USA, Chicago, IL, at a specific activity level of 100 U/g and 1200 U/g, and used as appropriate. The TGase solution was prepared by stirring water at room temperature (RT) with a magnetic stirrer and gradually adding mTGase powder. After the mTGase was fully dissolved, the solution was passed through a 0.5 micron syringe filter.

The mTGase solution was prepared at the following three concentrations:

mTGase solution TGase80: 80 U/ml (100 U=3 mg mTGase, so 2.4 mg mTGase/ml);

mTGase solution TGase120: 120 U/ml (100 U=3 mg mTGase, so 3.6 mg mTGase/ml);

mTGase solution TGase600: 600 U/ml (100 U=3 mg mTGase, so 18 mg mTGase/ml);

C. Preparation of PLCL Solution

PLCL solution P1 was prepared by dissolving PLCL (Resomer 703S from Evonik) into hexa-fluoro-isoporpanol (HFIP) at a concentration of 8% (w/w).

D. Liquid Electrospinning Mixtures (LEMs)

Figure 1:
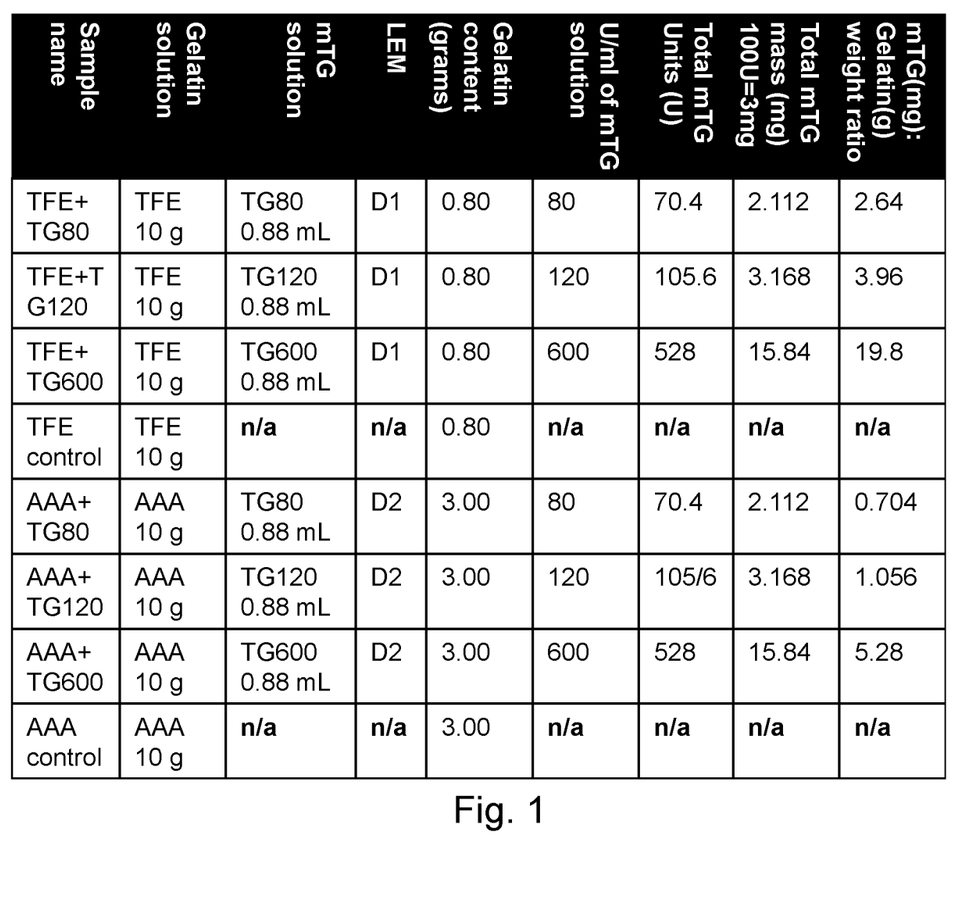
FIG. 1 shows a data table showing properties of LEM formulations in accordance with embodiments of the disclosure.

Reference is made to FIG. 1 showing a table showing properties of various exemplary LEM formulations. LEM D1 comprising mTGase and Gelatin in TFE was prepared by mixing 10 gr of 8% gelatin solution in TFE (0.8 gr gelatin in 9.2 gr TFE) with 0.88 ml of one of mTGase solutions TGase80, TGase120 or TGase600, depending of the desired mTGase concentration, together with between 0.22 gr and 0.3 gr of surfactant Span 80. Each of the three LEM D1 samples shown in FIG. 1 (TFE+TG80, TFE+TG120, and TFE+TG600) has a different amount of mTG relative to a same amount of gelatin. As such, each LEM D1 sample is characterized by a different mTG (mg):gelating (gr) ratio, ranging from 2.64 mg:1 g to 19.8 mg:1 g. mTGase is not soluble in TFE, and adding mTGase to TFE only (pure TFE+mTGase mixture) results in heavy precipitation of mTGase. However, presence of gelatin in LEM D1 appeared to protect mTGase from precipitation—LEM D1 exhibited considerably less precipitation compared to the pure TFE+ mTGase mixture. In addition, LEM D1 appeared to form an emulsion, as it exhibited a turbid appearance, in contrast to the mTGase solution and the gelatin+TFE solution, which were both clear prior to mixing. LEM D1 had a pH of 5.

LEM D2 comprising mTGase and gelatin in acetic acid was prepared by mixing 10 gr of 300 mg/ml gelatin solution AAA (300 mg/ml gelatin in 75% acetic acid) with 0.88 ml of one of mTGase solutions TGase80, TGase120 or TGase600, depending of the desired mTGase concentration, together with between 0.1 gr to 0.35 gr of surfactant Span 80. Each LEM D2 sample shown in FIG. 1 (AAA+TG80, AAA+TG120, and AAA+TG600) has a different amount of mTG relative to a same amount of gelatin. As such, each LEM D2 sample is characterized by a different mTG (mg): gelatin (gr) ratio, ranging from 0.704 mg:1 g to 5.28 mg:1 g. LEM D2 samples appeared to form an emulsion, as it exhibited a turbid appearance, in contrast to the mTGase solution and the gelatin+AAA solution, which were clear prior to mixing. LEM D2 samples had a pH of 5. The presence of gelatin appeared to promote emulsification of the mTGase solution with the gelatin+AAA solution, because mixing mTGase into 75% acetic acid, without gelatin resulted in a clear solution without any turbidity.

LEM D3 comprising mTGase and PLCL in HFIP was prepared by mixing 10 gr PLCL solution P1 (8% PLCL in HFIP=0.8 gr PLCL in 9.2 gr HFIP) with 0.88 ml of one of mTGase solutions TGase80, TGase120 or TGase600, depending of the desired mTGase concentration, together with 1% w/w surfactant Span 80.

For each of LEM D1-D3, the mixture were shaken by hand, vortexed at 3000 rpm for 3 min, and subsequently sonicated for 3 minutes using a Hielscher ultrasonic processor, UP50H (50 W, 30 kHz), alternately using a mechanical homogenizer.

Example 2: Preparing mTGase-Gelatin Nanofibers (X-Nano Fibers) with Single-Fiber TGase Inactivated Electrospinning Nanofibers were produced using a Drum Electrospinning Unit (E-Spin nanotech, India). Depending on the particular nanofiber being produced, the relevant LEM or solution was placed in a horizontally positioned plastic syringe (5 mL) with a flat end metal needle of gauge 20G. The syringe was operated by a syringe pump to feed the liquid at a rate of 2-6 milliliters per hour (mL/hr), and the needle was subjected to a high-voltage DC power of 18-30 kV relative to a vertically grounded drum rotating at a constant 1000 RPM. The drum was positioned 15 cm from the needle tip, which was covered by a parchment paper (baking sheet) to collect fibers. The fibrous nonwoven mats were dried in RT overnight and peeled off for subsequent analysis. The spinning atmosphere was air at a relative humidity of 40 RH (relative humidity).

Three samples of LEM D1 made from mixing 10 gr of gelatin solution TFE (8% w/w gelatin in TFE) with 0.88 mL of one of mTGase solutions TGase80, TGase120 or TGase600, respectively, were electrospun into nanofibers ("mTGase-gelatin nanofibers") that comprise gelatin and mTGase in a same nanofiber. Additionally, three samples of LEM D2 made from mixing 10 gr of gelatin solution AAA (300 mg/ml gelatin in 75% Acetic Acid) with 0.88 mL of one of mTGase solution TGase80, TGase120 or TGase600, respectively, were electrospun into mTGase-gelatin nanofibers (X-Nano fibers). Each LEM sample was separately electrospun in the Drum Electrospinning Unit under a positive charge of 20 kW-30 kW and a flow rate of 3 to 6 mL/hr. Two control samples, each sample comprising TFE-based gelatin solution TFE (without a mTGase solution) or acetic acid-gelatin solution AAA (without a mTGase solution) were also electrospun to produce gelatin-only control nanofibers.

Nanofibers were electrospun from the various LEM formulations described above and shown in FIG. 1 and collected to form different Fiberglue types, and their adhesive properties were tested in a T-peel test, as described below.

Example 3: T-Peel Test

Figure 2:
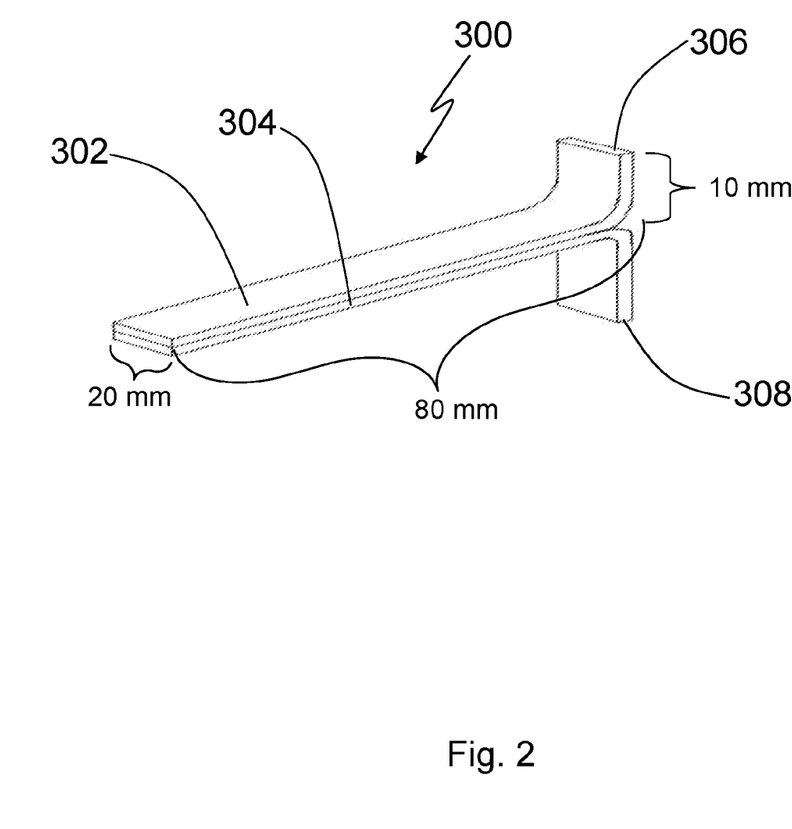
FIG. 2 shows a schematic illustration of a T-peel test being conducted on a Fiberglue in accordance with an embodiment of the disclosure.

The purpose of a T-peel test is to determine the relative peel resistance of adhesive bonds (in this case Fiberglue types comprising X-Nano fibers) between flexible adherends by means of a T-type specimen, as shown in FIG. 2. The term flexible refers to the ability of the adherend to bend through 90° without breaking or cracking. This test geometry has been adopted by most standards bodies and is widely used by industry to evaluate environmental durability of adhesively bonded systems.

A collagen film taking from a collagen casing was employed as an adherend to model soft tissue for determination of bonding strength of the various Fiberglue formulations produced in Example 2 above. As seen in FIG. 2, showing T-peel test 300 being conducted on a Fiberglue, two collagen films 302 & 304, each having a width of 20 mm, were wetted with water and bonded together with one of the Fiberglue formulations produced as described in Example 2 over a length of 80 mm. The Fiberglue was placed between films 302 and 304, and is thus not visible in FIG. 2. A 50 g weight was applied to the bonded collagen films to remove air pockets, if any, and to ensure proper bonding. The Fiberglue was then allowed to cure for 2 minutes before initiation of the T-peel test, which was conducted as described below.

Two unbounded ends 306 and 308 of the two collagen films 302 and 304, respectively, were bent in opposite directions until each end was perpendicular to the bonded assembly to form a T-shaped specimen.

Then, the two unbounded ends 306 and 308 were mounted into the jaws of an Instron mechanical tester 3345 (not shown) and the bonding strength, in Newtons (N) was measured at 25° C. As shown in FIG. 2, the bonded collagen films remains perpendicular to the applied load, and as a result of the load, the specimen is bent backwards 180° and peeled at a displacement rate of 40 mm/min, and an average peeling load per unit length/width was used to define the peel strength.

Figure 3:
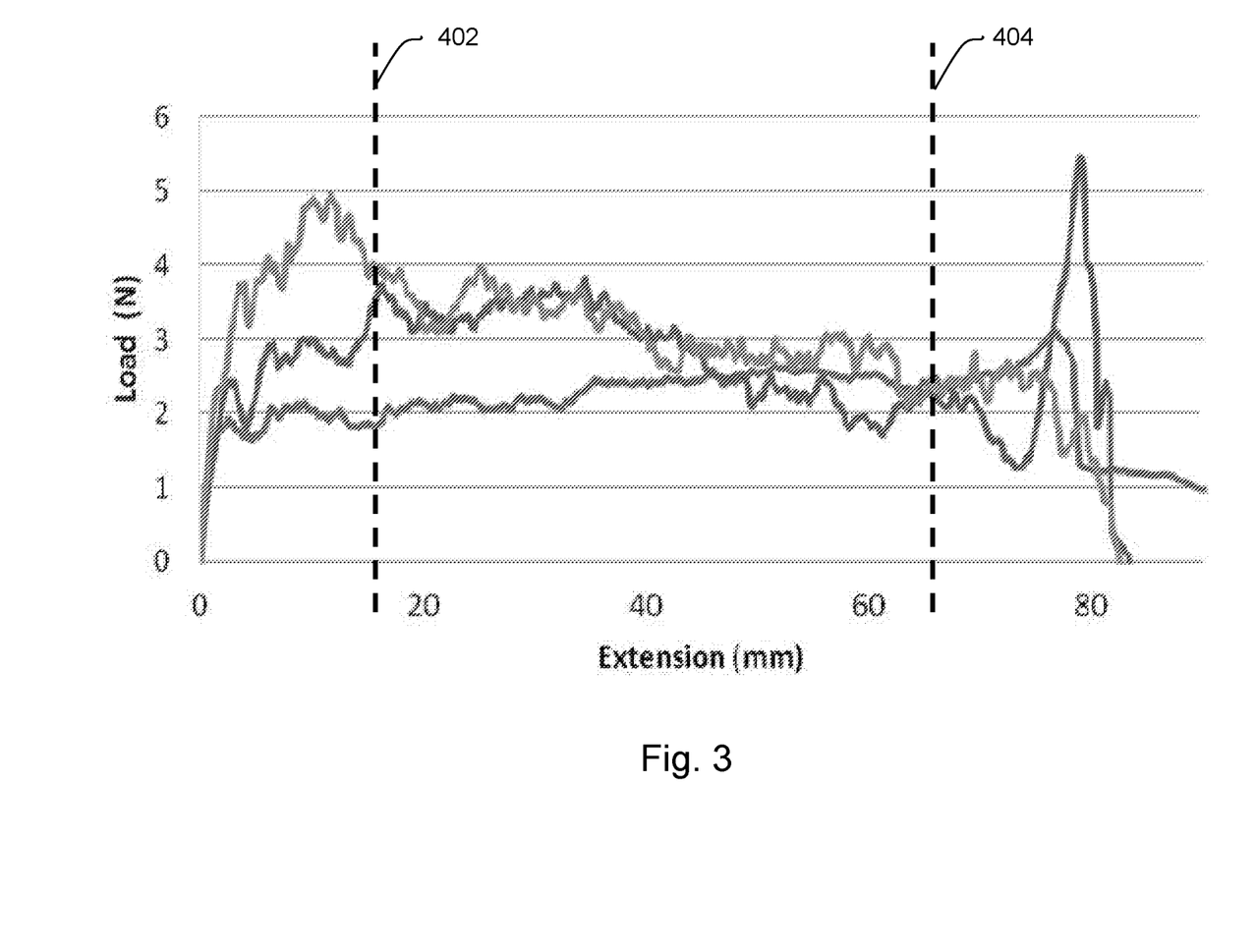
FIG. 3 shows sample T-peel test measurements of a Fiberglue in accordance with an embodiment of the disclosure.

An average peeling load was determined for each Fiberglue formulation produced in Example 2. Three samples from each Fiberglue formulation were tested (n=3) to measure the peeling load throughout the entire 80 mm length of the bonded area. These results were also compared to commercially available surgical adhesives VetBond®, an n-butyl cyanoacrylate surgical adhesive and Evicel®, a human fibrin-based surgical sealant. The initial 20% (up to 16 mm) and the terminal 20% (from 64 mm and onwards) from each reading were excluded from further analysis in order to exclude readings near initiation and termination of the peeling, which typically produce irregular measurements. The peeling load as measured between 20% and 80% of the bond length for each sample were averaged to determine a peeling load for each sample, and the peeling load for each sample was averaged over the three samples to determine an average peeling load for the formulation. FIG. 3 shows a graph of peeling load measurements taking from three samples of a Fiberglue formulation. For each sample, the peeling load measured prior to 16 mm (20% of 80 mm; dashed line 402) and after 64 mm (80% of 80 mm; dashed line 404) were excluded from the average peeling load measured for each sample. As can be seen in the sample readings shown in FIG. 3, the peeling load measurement between 16 mm and 64 mm for each sample remains relatively stable compared to the measurements within the first 16 mm and within the last 16 mm, which are relatively unstable and irregular.

Table 2 below shows the average peeling load (in Newtons) for each of the various Fiberglue types produced in Example 2, as measured by the T-peel test and calculated as described above. All results shown in Table 2 except for "VetBond Dry" were obtained from T-peel tests under wet conditions, in which the collagen films were wetted prior to adhesion.

| Sample | Description | AVG | STD | N |
|---|---|---|---|---|
|  | VetBond Dry | 2.22 | 0.3947 | 2 |
|  | VetBond Wet | 1.16 | 0.3134 | 3 |
|  | Evicel | 0.16 | 0.0884 | 3 |
| C1 | AAA control | 0.54 | 0.1293 | 3 |
| 3 | AAA + TG80 | 0.39 | 0.0877 | 3 |
| 7 | AAA + TG120 | 0.31 | 0.076 | 3 |
| 9 | AAA + TG600 | 2.07 | 0.1256 | 3 |
| C2 | TFE control | 0.36 | 0.1769 | 3 |
| 6 | TFE + TG80 | 0.66 | 0.2946 | 3 |
| 8 | TFE + TG120 | 0.91 | 0.2091 | 3 |
| 10 | TFE + TG600 | 2.73 | 0.3265 | 3 |

AVG = mean peeling load in Newtons;
N = number of samples

Figure 4:
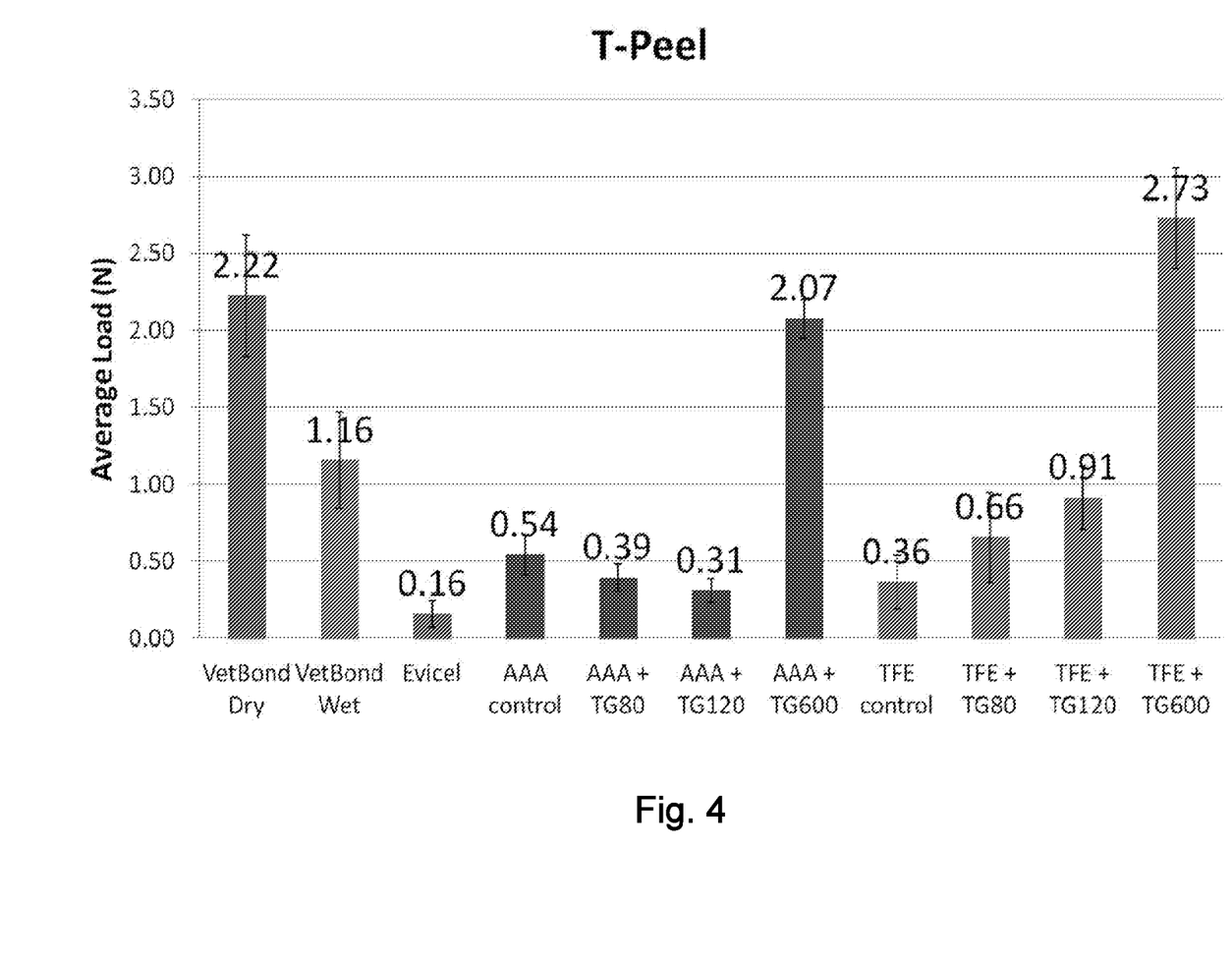
FIG. 4 shows a bar graph of T-peel test results showing adhesives strength of different Fiberglue types in accordance with embodiments of the disclosure.

The data shown in Table 2 above is also presented as a bar graph in FIG. 4. Note that the Fiberglue types listed in Table 2 and shown in FIG. 4 are identified in accordance with the LEM samples (TFE+TG80, TFE+TG120, TFE+TG120, AAA+TG80, AAA+TG120, AAA+TG120 as shown in FIG. 1) that were used to produce the respective Fiberglue types. The adhesive strength of Vetbond was tested between dry collagen films ("Vetbond Dry"), as well as wet collagen films ("Vetbond Wet"). As is readily apparent in both Table 2 and FIG. 3, Vetbond® was substantially less effective as an adhesive for wet collagen films compared to dry ones. The adhesive force provided by Vetbond® between dry collagen films is 2.22 N, but only 1.16 N between wet collagen films. Evicel® performed even worse as an adhesive between wet collagen films. Of the Fiberglue types, which were all tested with wetted collagen films, the formulations using the TGase600 mTGase solution showed particularly strong adhesive properties. The TFE+TGase600 Fiberglue type, which has a mTGase (mg):gelatin (g) weight ratio of 19.8 mg:1 g (See FIG. 1), provided adhesion of 2.07 N and the AAA+TGase600 formulation, which has a mTGase (mg): gelatin (g) weight ratio of 5.28 mg:1 g (See FIG. 1), provided adhesion of 2.73 N. As such, the TFE+TGase600 and AAA+TGase600 Fiberglue types demonstrated stronger adhesion than Vetbond® in a wet environment, and the TFE+TGase600 Fiberglue type tested in a wet environment demonstrated stronger adhesion even compared to Vetbond® in a dry environment.

Example 4: Preparing a Fiberglue with Two-Fiber TGase Inactivated Electrospinning Nanofibers were produced with two-fiber TGase inactivate electrospinning in accordance with an embodiment of the disclosure using a Drum Electrospinning Unit (E-Spin nanotech, India). LEM D3 comprising mTGase and PLCL in HFIP as described in Example 1 was put in a first plastic syringe (5 mL) and an AAA gelatin solution, or alternatively TFE gelatin solution, as described in Example 1 was placed in a second plastic syringe. The first and second syringes were both positioned with a flat end metal needle of gauge 20G. The syringes were each operated by a syringe pump to feed the liquid at a rate of 2-6 mL/hr, and the needle was subjected to a high-voltage DC power of 18-30 kV relative to a vertically grounded drum rotating at a constant 1000 RPM. The drum was positioned 15 cm from the needle tip, which was covered by a parchment paper (baking sheet) to collect fibers. The mTGase-PLCL nanofiber from the first syringe and the gelatin nanofiber from the second syringe were electrospun simultaneously and allowed to commingle and form a mat (a Fiberglue) on the parchment paper on the grounded drum. The nanofiber mats were dried in RT overnight and peeled off for subsequent analysis. The spinning atmosphere was air at a relative humidity of 40 RH.

There is therefore provided in accordance with an embodiment of the disclosure a nanofiber comprising a cross-linkable protein polymer and a transglutaminase.

In an embodiment of the disclosure, the cross-linkable protein polymer comprises lysine and glutamine residues not in a cross-linked state. Optionally, at least 25%, at least 50%, at least 75%, or at least 90% of the lysine and glutamine residues comprised in the cross-linkable protein polymer are not in a cross-linked state.

In an embodiment of the disclosure, the cross-linkable protein polymer comprises one or more selected from the group consisting of a fibrin, an elastin, an albumin, a gelatin and a collagen. Optionally, the cross-linkable protein polymer comprises a gelatin.

In an embodiment of the disclosure, the weight ratio of TGase (mg):gelatin (g) is between 1 mg:1 g and 20 mg:1 g.

In an embodiment of the disclosure, transglutaminase is a microbial transglutaminase.

There is also provided in accordance with and embodiment of the disclosure a nanofiber mat comprising a plurality of nanofibers in accordance with an embodiment of the disclosure. Optionally, the nanofiber mat is operable to provide adhesion of at least 1 Newton (N), or at least 2 N, as measured by a T-peel test between two surfaces adhered to with the nanofiber mat, wherein the two surfaces respectively comprises wetted collagen films having a width of 20 mm and length of 80 mm, and the speed of peeling is 40 millimeters per minute.

There is also provided in accordance with an embodiment of the disclosure a method for producing a nanofiber, the method comprising: combining a first solution comprising a cross-linkable protein polymer and a second solution comprising a TGase to produce a liquid electrospinning mixture (LEM) characterized by an environment that is unsuitable for the TGase to be enzymatically active on the cross-linkable protein polymer; and electrospinning the LEM to form a nanofiber comprising the TGase and the cross-linkable protein polymer.

In an embodiment of the disclosure, the environment unsuitable for the TGase to be enzymatically active on the cross-linkable protein polymer is one or more of: a pH of 5 or less; a combined liquid composition of the LEM being less than 50% water and/or more than 50% organic solvent; the LEM being an emulsion comprising a first phase and a second phase, wherein the first solution is comprised in the first phase and second solution is comprised in the second phase.

In an embodiment of the disclosure, the first solution comprises the cross-linkable protein polymer dissolved in an acidic solvent. Optionally, the acidic solvent comprises acetic acid or formic acid. Optionally, the acidic solvent consists of glacial acetic acid.

In an embodiment of the disclosure, the first solution comprises the cross-linkable protein polymer dissolved in an organic solvent. Optionally, the organic solvent is selected from the group consisting of: 2,2,2-Trifluoroethanol (TFE) and 1,1,1,3,3,3-hexafluoro-2-propanol (HFIP).

In an embodiment of the disclosure, the LEM comprises a surfactant. Optionally, the surfactant comprises one or a combination of two or more of: a cationic surfactant, an ionic surfactant, and a non-ionic surfactant.

In an embodiment of the disclosure, the cross-linkable protein polymer comprises one or more selected from the group consisting of a fibrin, an elastin, an albumin, a gelatin and a collagen. Optionally the, cross-linkable protein polymer comprises a gelatin.

There is also provided in accordance with an embodiment of the disclosure, a nanofiber mat comprising: a first nanofiber comprising a synthetic polymer and the transglutaminase; and a second nanofiber comprising the cross-linkable protein polymer. Optionally, the synthetic polymer comprises a biocompatible polyester. Optionally, the synthetic polymer comprises a Polycaprolactone (PCL) or a poly (lactide-co-e-caprolactone) (PLCL). Optionally, the synthetic polymer comprises one or more of: a PC (polycarbonate); a PCU (polycarbonate uethane); a PDO,PDS (Polydioxanone); a PEO (poly ethylene oxide); a PES (polyesthersulfone); a PEVA (poluethylene-co-vinyl acetate); a PGA (polyglutamic acid); a PGCA (poly(glycolic acid); a PGS (poly(glycerol sebacate); a PHBV (Poly(3-hydroxybutyrate-co-3-hydroxyvalerate); a PHB (Polyhydroxybutyrate); a PLA (Poly(L-lactic)); a PLA-PEG (D,L-Lactic-polyethylene glycol); a PLGA (poly(lactic-co-glycolic acid); a PLLA (poly-L-lactic acid); a PMMA (poly(methyl methacrylate); a PU (poly urethane); a PVA (poly vinyl alcohol); a PVAc (poly vinyl acetate); and a PVP (poly vinyl pyrrolidone).

In an embodiment of the disclosure, the cross-linkable protein polymer comprises lysine and glutamine residues not in a cross-linked state. Optionally, at least 25%, at least 50%, at least 75%, or at least 90% of the lysine and glutamine residues comprised in the cross-linkable protein polymer are not in a cross-linked state.

In an embodiment of the disclosure, the cross-linkable protein polymer comprises one or more selected from the group consisting of a fibrin, an elastin, an albumin, a gelatin and a collagen. Optionally, the cross-linkable protein polymer comprises a gelatin.

There is also provided in accordance with an embodiment of the disclosure a method for producing a nanofiber mat, the method comprising: electrospinning a first LEM comprising a cross-linkable protein polymer to form a first nanofiber; electrospinning a second LEM comprising a TGase and a synthetic polymer to form a second a nanofiber; and directing the first and second nanofibers to a common target surface, such that the first and second nanofibers commingle to form the nanofiber mat.

In an embodiment of the disclosure, the cross-linkable protein polymer comprises one or more selected from the group consisting of a fibrin, an elastin, an albumin, a gelatin and a collagen. Optionally, the cross-linkable protein polymer comprises a gelatin.

In an embodiment of the disclosure, the synthetic polymer comprises a biocompatible polyester. Optionally, the synthetic polymer comprises a Polycaprolactone (PCL) or a poly (lactide-co-e-caprolactone) (PLCL). Optionally, the synthetic polymer comprises one or more of: a PC (polycarbonate); a PCU (polycarbonate uethane); a PDO,PDS (Polydioxanone); a PEO (poly ethylene oxide); a PES (polyesthersulfone); a PEVA (poluethylene-co-vinyl acetate); a PGA (polyglutamic acid); a PGCA (poly(glycolic acid); a PGS (poly(glycerol sebacate); a PHBV (Poly(3-hydroxybutyrate-co-3-hydroxyvalerate); a PHB (Polyhydroxybutyrate); a PLA (Poly(L-lactic)); a PLA-PEG (D,L-Lactic-polyethylene glycol); a PLGA (poly(lactic-co-glycolic acid); a PLLA (poly-L-lactic acid); a PMMA (poly(methyl methacrylate); a PU (poly urethane); a PVA (poly vinyl alcohol); a PVAc (poly vinyl acetate); and a PVP (poly vinyl pyrrolidone).

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:
1. A nanofiber produced by a method comprising:
combining a first solution comprising a cross-linkable protein polymer and a second solution comprising a transglutaminase to produce a liquid electrospinning mixture (LEM), wherein the LEM is characterized by an environment that is unsuitable for said transglutaminase to be enzymatically active on the cross-linkable protein polymer; and
electrospinning the LEM to form the nanofiber comprising said cross-linkable protein polymer and said transglutaminase.

2. The nanofiber according to claim 1, wherein the cross-linkable protein polymer comprises lysine and glutamine residues not in a cross-linked state.

3. The nanofiber according to claim 1, wherein at least 25% of the lysine and glutamine residues comprised in the cross-linkable protein polymer are not in a cross-linked state.

4. The nanofiber according to claim 1, wherein the cross-linkable protein polymer comprises one or more selected from the group consisting of a fibrin, an elastin, an albumin, a gelatin and a collagen.

5. The nanofiber according to claim 1, wherein the cross-linkable protein polymer comprises a gelatin.

6. The nanofiber according to claim 5, wherein the weight ratio of the transglutaminase (mg) to the gelatin (g) is between 1 mg:1 g and 20 mg:1 g.

7. A nanofiber mat comprising a plurality of nanofibers according to claim 1.

8. A method for producing a nanofiber, the method comprising:
   combining a first solution comprising a cross-linkable protein polymer and a second solution comprising a transglutaminase to produce a liquid electrospinning mixture (LEM) characterized by an environment that is unsuitable for the transglutaminase to be enzymatically active on the cross-linkable protein polymer; and
   electrospinning the LEM to form a nanofiber comprising the transglutaminase and the cross-linkable protein polymer.

9. The method according to claim 8, wherein the environment unsuitable for the transglutaminase to be enzymatically active on the cross-linkable protein polymer is one or more of:
   a pH of 5 or less;
   a combined liquid composition of the LEM being less than 50% water and/or more than 50% organic solvent; and
   the LEM being an emulsion comprising a first phase and a second phase, wherein the first solution is comprised in the first phase and second solution is comprised in the second phase.

10. The method according to claim 9, wherein the organic solvent is selected from the group consisting of: 2,2,2-Trifluoroethanol (TFE) and 1,1,1,3,3,3-hexafluoro-2-propanol (HFIP).

11. The method according to claim 8, wherein the LEM comprises a surfactant.

12. The method according to claim 8, wherein the cross-linkable protein polymer comprises one or more selected from the group consisting of a fibrin, an elastin, an albumin, a gelatin and a collagen.

13. The method according to claim 8, wherein the cross-linkable protein polymer comprises a gelatin.

14. The nanofiber according to claim 1, wherein the environment unsuitable for the TGase to be enzymatically active on the cross-linkable protein polymer is one or more of:
   a pH of 5 or less;
   a combined liquid composition of the LEM being less than 50% water and/or more than 50% organic solvent; and
   the LEM being an emulsion comprising a first phase and a second phase, wherein the first solution is comprised in the first phase and second solution is comprised in the second phase.

15. The nanofiber according to claim 14, wherein the first solution comprises the cross-linkable protein polymer dissolved in at least one selected from a group consisting of an acidic solvent, an organic solvent and any combination thereof.

16. The nanofiber according to claim 15, wherein the acidic solvent comprises at least one acid selected from a group consisting of acetic acid, formic acid, glacial acetic acid and any combination thereof.

17. The nanofiber according to claim 15, wherein the organic solvent is selected from the group consisting of: 2,2,2-Trifluoroethanol (TFE) and 1,1,1,3,3,3-hexafluoro-2-propanol (HFIP).

18. The nanofiber according to claim 14, wherein the LEM comprises a surfactant.

19. The nanofiber according to claim 18, wherein the surfactant comprises one or a combination of two or more of: a cationic surfactant, an ionic surfactant, and a non-ionic surfactant.

20. The nanofiber according to claim 14, wherein the cross-linkable protein polymer comprises one or more selected from the group consisting of a fibrin, an elastin, an albumin, a gelatin and a collagen.

21. A nanofiber produced by a method comprising:
   combining a first solution comprising a cross-linkable protein polymer and a second solution comprising a transglutaminase to produce a liquid electrospinning mixture (LEM), wherein the LEM is characterized by an environment that is unsuitable for said transglutaminase to be enzymatically active on said cross-linkable protein polymer; and
   electrospinning the LEM to form the nanofiber comprising said cross-linkable protein polymer and said transglutaminase,
   wherein said cross-linkable protein polymer comprises or consists of gelatin.

22. The nanofiber according to claim 21, wherein said gelatin comprises lysine and glutamine residues not in a cross-linked state.

23. The nanofiber according to claim 21, wherein at least 25% of the lysine and glutamine residues comprised in the cross-linkable protein polymer are not in a cross-linked state.

24. The nanofiber according to claim 21, wherein the weight ratio of TGase (mg):gelatin (g) is between 1 mg:1 g and 20 mg:1 g.

25. The nanofiber according to claim 21, wherein the transglutaminase is a microbial transglutaminase.

26. The nanofiber according to claim 21, wherein the environment unsuitable for the TGase to be enzymatically active on said gelatin is one or more of:
   a pH of 5 or less;
   a combined liquid composition of the LEM being less than 50% water and/or more than 50% organic solvent; and
   the LEM being an emulsion comprising a first phase and a second phase, wherein the first solution is comprised in the first phase and second solution is comprised in the second phase.

27. The nanofiber according to claim 26, wherein the first solution comprises said gelatin dissolved in at least one selected from a group consisting of an acidic solvent, organic solvent and any combination thereof.

28. The nanofiber according to claim 27, wherein the acidic solvent comprises at least one selected from a group consisting of acetic acid, formic acid, glacial acetic acid and any combination thereof.

29. The nanofiber according to claim 27, wherein the organic solvent is selected from the group consisting of: 2,2,2-Trifluoroethanol (TFE) and 1,1,1,3,3,3-hexafluoro-2-propanol (HFIP).

30. The nanofiber according to claim 26, wherein the LEM comprises a surfactant.

31. The nanofiber according to claim 30, wherein the surfactant comprises one or a combination of two or more of: a cationic surfactant, an ionic surfactant, and a non-ionic surfactant.

32. A nanofiber mat comprising a plurality of nanofibers according to claim 21.

33. The nanofiber mat according to claim 32 that is operable to provide adhesion of at least 1 N as measured by a T-peel test between two wetted surfaces adhered to with the nanofiber mat, wherein the two wetted surfaces respectively comprises wetted collagen films having a width of 20 mm and length of 80 mm, and the speed of peeling is 40 millimeters per minute.

34. The nanofiber mat according to claim 33, wherein the adhesion as measured by the T-peel test is at least 2 N.

* * * * *